May 26, 1970  V. B. MORRIS  3,513,897
ANTISKID DEVICE
Filed July 13, 1967

VIRGINIA B. MORRIS
INVENTOR.

BY John G. Mills

ATTORNEY.

United States Patent Office 3,513,897
Patented May 26, 1970

3,513,897
ANTISKID DEVICE
Virginia B. Morris, 2716 Wayland Drive,
Raleigh, N.C. 27608
Filed July 13, 1967, Ser. No. 653,079
Int. Cl. B60c 27/06
U.S. Cl. 152—233                          2 Claims

ABSTRACT OF THE DISCLOSURE

In abstract, a preferred embodiment of this invention is an antiskid set of tire chains having a split O-ring on the backside of the tire to encompass the vehicle axle with at least two independent rear brackets mounting road engaging chains which are secured to a front bracket on the exterior side of the tire which in turn is supported by a crossmember.

---

This invention relates to antiskid devices generally and more particularly to readily attachable and detachable vehicle wheel antiskid devices.

In the past, various attempts have been made to produce satisfactory antiskid devices which may be easily put on the drive wheels of vehicles in inclement weather. Other attempts have been made to produce chain type devices which are adjustable to varying wheel sizes so that they could be sold as a universally adaptable unit. Due to the complex installation and removal processes as well as complicated adjusting means, these universal antiskid devices or chains have not been considered satisfactory. Further, almost all of the antiskid devices presently available require the wheel upon which it is being installed to be lifted off the ground. This is not only time consuming but extremely inconvenient as well. In the prior art devices, when one or more of the transverse chains becomes worn to the point that it breaks, the whole unit is discarded and another unit purchased at a considerable expense.

Over the years, attempts have been made to secure, in one manner or another, antiskid chains which are removably secured directly to the rim of the wheel. These devices have proved completely unsatisfactory since there is ordinarily no means for adjusting the tension of the transverse linkages as well as being extremely expensive to initially produce.

The present invention has been developed after much research and study into the above mentioned problems and is designed to provide an adjustable, universal type antiskid device which may readily be used with wheels of varying sizes while at the same time eliminating the necessity for lifting the wheel off the ground during the installation of the unit. This improved antiskid device also has means for allowing broken transverse portions of the chain or antiskid means to be replaced without having to replace the whole unit. To overcome the securing and releasing problems encountered by the prior art devices, applicant has included within her invention a much improved latching means for fastening the unit in place and for releasing it when said unit is removed from the tire.

It is, therefore, an object of the present invention to provide an improved antiskid device which is readily adaptable to be adjustably secured to vehicle wheels of various sizes.

Another object of the present invention is to provide an antiskid device which includes a simple, efficient securing means which is easily engaged and released in various adjusted positions.

A further object of the present invention is to provide a vehicle wheel antiskid device which is so constructed as to be readily attachable transversely across the tread of the wheel from front to rear while the tire is in normal contactive relationship to the ground.

Another object of the present invention is to provide a chain type antiskid device which allows the user thereof to replace broken chain section without having to replace the entire unit.

Other objects and advantages of the present invention will become apparent and obvious from a study of the following description and the accompanying drawings which are merely illustrative of the present invention.

Figure 1:
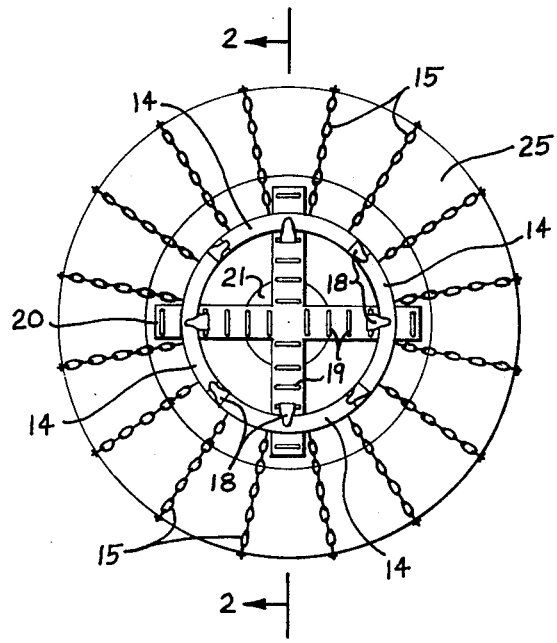
FIG. 1 is a front elevational view of the antiskid device of the present invention in mounted position.
Figure 2:
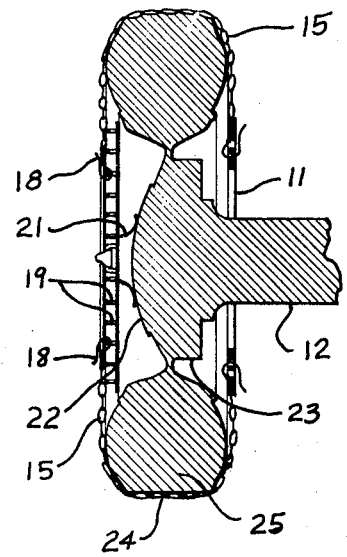
FIG. 2 is a section taken through lines 2—2 of FIG. 1.
Figure 3:
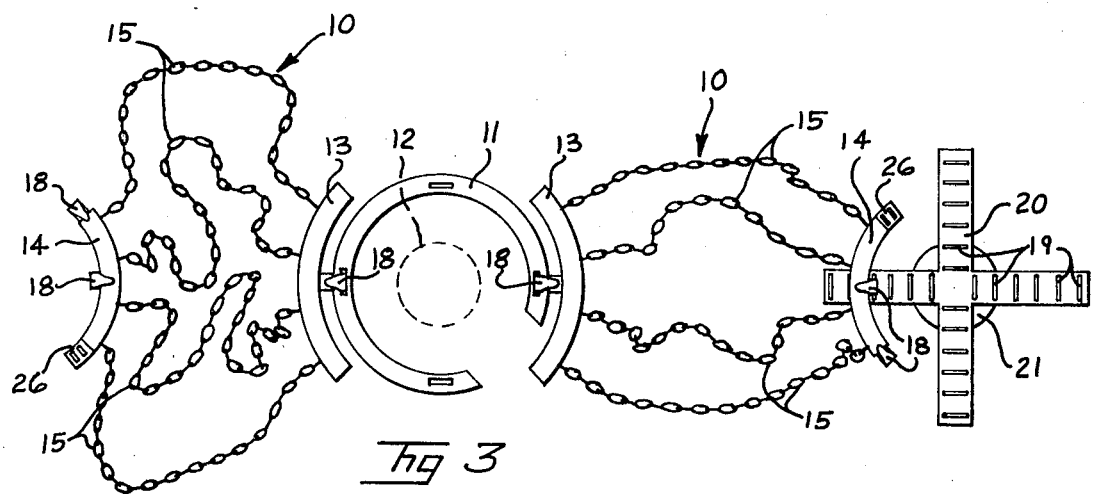
Figures 4, 5, 6:
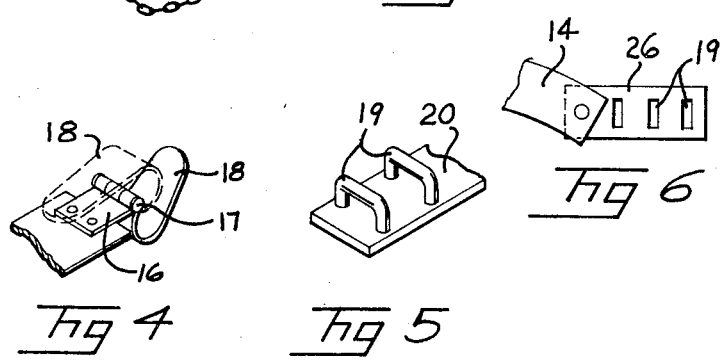

FIG. 3 discloses the relationship of the various parts of the present invention in semiassembled condition;

FIG. 4 is an enlarged perspective of a latch means;

FIG. 5 is an enlarged perspective of a loop means used with the latch means; and FIG. 6 is a modification of the loop end of the front bracket.

With further reference to the drawings, a split O-ring 11 is provided wherein the split opening is of a size greater than the diameter of a cross-section of the rear axle 12 of a vehicle (not shown).

Each of a series of chain sections indicated generally at 10 are composed of a rear arc shaped bracket 13, a front arc shaped bracket 14 and transverse chain sections 15 fixedly secured at one end to said rear bracket and the other end to said front bracket.

A securing or fastening means such as the latch disclosed in FIG. 4 having a based portion 16 adapted to be fixedly secured to the brackets of the present invention as will be hereinafter described, a pivot pin 17 and a latch clasp 18 is adapted to releasably connect each of the rear brackets 13 to the split O-ring 11 as well as front brackets 14 to each other and to cross-member 20.

A series of spaced, parallelly disposed U-shaped projections 19 are provided along the arm of cross-member 20 and are adapted to receive latch clasp 18 as will hereinafter be described.

At one end of the front bracket 14 is a latch clasp of the type hereinabove described and at the other end thereof is a series of raised projections similar to those disclosed in FIG. 5 and described in connection with front cross-member 20. If preferred, the portion of the front bracket containing the multiplicity of U-shaped projection may be pivoted as disclosed in FIG. 6 to allow easier adjustment of the chain sections 10 as well as aiding in assembly and disassembly process.

A suction cup indicated at 21 may be either fixedly or releasably secured to the center of cross-member 20 thereby holding the same in relative fixed relation to the hub cap 22 of wheel 23 until the chain sections 10 are secured thereto. This is particularly useful when only two sections of chain are used.

In actual use of the antiskid device of the present invention, whenever it is desirable to give more traction to the rear or drive wheels of a vehicle, at least two of the chain sections are connected on opposite sides of split O-ring 11 by means of latches 18. The O-ring 11 is then placed over the axle 12 adjacent the rear or interior side of the wheel. The chains are now brought over the wheel on opposite sides thereof and front arc shaped brackets 14 are adjustably connected to the ends of one of the cross arms of cross-member 20. Thus it can be seen that a quickly mountable emergency traction means may be easily secured to the wheel of the vehicle to give more traction thereto. Although it is not always desirable to use only two of the chain sections 10, the use of this number gives very good results in an emergency.

Should the maximum amount of traction be desired with transverse chain links spaced at even intervals all along the circumferential tread 24 of the tire 25, the same process is followed in connecting the rear brackets 13 to O-ring 11 except that four brackets are connected in two opposing pairs instead of a single opposing pair as hereinabove described. The O-ring is then placed over the axle on the backside of the wheel 23 in such a manner that one of the brackets 13 is downwardly disposed from said ring thus disposing the other three brackets to each side and above said ring. When the chain sections 10 are passed over the wheel, they will be disposed on three of the four sides of the wheel leaving the area adjacent the ground upon which the wheel is resting to be later secured. The two front brackets 14 connected to the chain sections on either side of the tire are connected at one of their ends to the bracket 14 coming over the top of the tire. The wheel may now be rotated anywhere between 45 degrees and 315 degrees to allow the area of the tread 24 not covered by the formally downwardly disposed chain section to be covered. Once this rotation of the tire is accomplished, then each end of the last bracket 14 is secured to its two adjacent brackets thereby forming a closed disassemblable O-ring. To assure a proper, snug fit of the chain sections 10 about the wheel 25, any one of the various U-shaped projections 19 may be engaged in either the fixed or pivoted portion 26 of the front brackets 14.

Once the proper tension adjustment is obtained on the chain sections 10, crossmember 20 may be inserted between the now formed O-ring on the front or outer side of the wheel and the wheel itself. The latch means 18 in the center of each of the brackets 14 are adjustably attached to the arms of said crossmember. If the hub cap of the vehicle extends to a point adjacent to or beyond the plane bisecting the front or outside edge of the vehicle tire, then the crossmember 20 may be bent to form a slightly concaved member over said hub. Some type of padding such as a suction cup, foam rubber or the like may be used, if desired, in the center portion of the crossmember to prevent it from scratching the hub cap due to the normal resonant movement of such member when the vehicle's tire is rotating. Obviously the use of the crossmember with the O-ring on the front of the tire gives added strength and stability to the antiskid device.

If a suction type pad such as that disclosed at 21 is used in conjunction with the crossmember 20, its function would be not only to prevent scratching of the hub cap 22 of the wheel 23 as hereinabove described, but it would also facilitate the connecting of the latches 18 of front brackets 14 when oly two chain sections 10 are being used.

Whenever it is determined that the normal traction of the tire 25 is adequate and that the auxiliary antiskid device is no longer needed, all that is necessary to remove such device from such tire is to release the latches securing at least two of the front brackets 14 so that the remaining assembly may be slipped from the front of the wheel. The rear split O-ring 11 may now be removed from about the axle 12 thus allowing the entire assembly to be removed from the wheel. Such assembly may now either be stored in its semiassembled condition or the various parts may now be easily separated for more compact packing away.

After prolonged use of the chain sections, particularly if they come into contact with paved roads or other hard surfaces, the individual transverse members of the chain sections 10 may wear to the point that they break. To replace these, all that is necessary is to remove them from the front braket 14 and rear bracket 13 and attach another piece of chain thereto. Means may be provided for easily releasing and securing these chain portions or the links could simply be cut and the new strip of chain spliced or otherwise secured thereinto. If, of course, all of the chain strips of the section 10 are badly worn, the individual section may be replaced without replacing the remainder of the assembly.

As is particularly obvious from FIG. 4, the latch means of the present invention are extremely simple although rugged in construction while at the same time being easy to operate with very little danger of their inadvertently releasing while the device is in use.

It is obvious that the present invention has the advantage of providing a wheel antiskid or traction increasing means which is readily adjustable to various sizes of wheels while at the same time being extremely easy to install and remove. The present invention further has the advantage of not requiring the wheel to which it is attached to be raised above the ground upon which it is resting during installation and removal.

The terms "front," "rear," "upper," "lower" and so forth have been used herein merely for the convenience in the foregoing specification and in the appended claims to describe the antiskid device and its parts as oriented in the drawings. It is to be understood, however, that these terms are in no way limiting to the invention since the device may obviously be disposed in many different positions when in use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced herein.

What is claimed is:

1. In an auxiliary traction device of the type having ground engaging means disposed transversely across the tread of an axle mounted vehicle, the improvement comprising: a generally semicircular mount means adapted to be disposed about said axle in spaced relation thereto; at least four generally arc shaped rear bracket means fixedly secured to one end of said ground engaging means and adapted to be releasably secured to said mount means; at least four arc shaped front bracket means fixedly secured to the end of said engaging means opposite said rear brackets; means for releasably securing said front brackets together; a crossmember means; and means for releasably securing said front bracket means to said crossmember whereby a sturdy, readily attachable and releasably auxiliary traction means may be provided for vehicle wheels.

2. The traction device of claim 1 wherein the various releasable securing means are pivot type latches.

References Cited
UNITED STATES PATENTS

| | | | |
|---|---|---|---|
| 2,174,345 | 9/1939 | Worthing | 152—233 X |
| 2,711,770 | 6/1955 | Conoscente et al. | 152—213 X |
| 3,121,454 | 2/1964 | Moore | 152—233 |
| 3,106,949 | 10/1963 | Timmons | 152—233 X |

ARTHUR L. LA POINT, Primary Examiner